United States Patent [19]
Arai et al.

[11] Patent Number: 5,287,220
[45] Date of Patent: Feb. 15, 1994

[54] ZOOM LENS HAVING AN ILLUMINATION SYSTEM INCORPORATED THEREIN

[75] Inventors: Junichi Arai; Osamu Nakada, both of Yono, Japan

[73] Assignee: Moritex Corp., Tokyo, Japan

[21] Appl. No.: 788,538

[22] Filed: Nov. 6, 1991

[30] Foreign Application Priority Data

Nov. 7, 1990 [JP] Japan .................. 2-116227

[51] Int. Cl.⁵ .................. G02B 21/06; G02B 15/14
[52] U.S. Cl. .................. 359/385; 359/390; 359/676; 359/699
[58] Field of Search .................. 359/811–830, 359/591–595, 385–390, 385–390, 676, 683, 694, 699–706, 798, 800, 808–830; 351/206, 212; 354/286, 149.1, 149.11, 223, 233, 403, 419; 362/335.33; 385/33, 115–117

[56] References Cited

U.S. PATENT DOCUMENTS

| | | | |
|---|---|---|---|
| 4,046,463 | 9/1977 | La Russa et al. | 351/212 |
| 4,291,938 | 9/1981 | Wagner | 359/387 |
| 4,596,449 | 6/1986 | Iwata et al. | 359/823 |
| 4,597,648 | 7/1986 | Feldon et al. | 351/212 |

FOREIGN PATENT DOCUMENTS 58-28712 2/1983 Japan .

OTHER PUBLICATIONS

Moritex, "Scopeman", Jun. 1990.
The English language abstract of the Japanese reference No. 58-28712.

*Primary Examiner*—Bruce Y. Arnold
*Assistant Examiner*—Thong Nguyen
*Attorney, Agent, or Firm*—Wenderoth, Lind & Ponack

[57] ABSTRACT

A zoom lens is disclosed which makes use of a space between an inner tube and an operating ring which does not impair operability of the zoom lens. Light guides are disposed in the space and illumination systems are incorporated in the zoom lens.

14 Claims, 2 Drawing Sheets

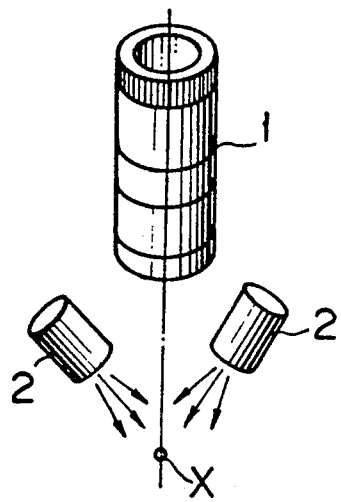
FIG. I(a) PRIOR ART
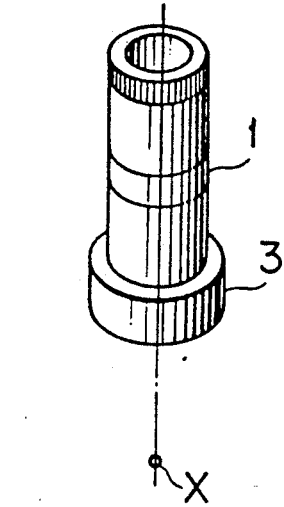
FIG. I(b) PRIOR ART
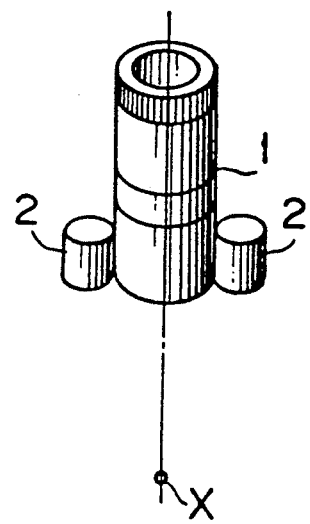
FIG. I(c) PRIOR ART
FIG. 2
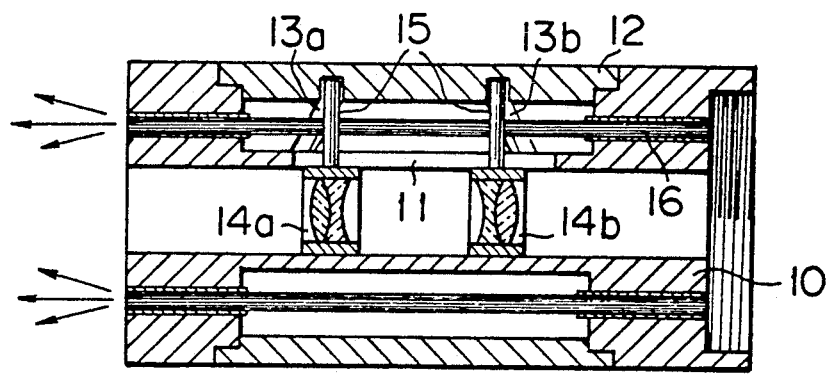
FIG. 3
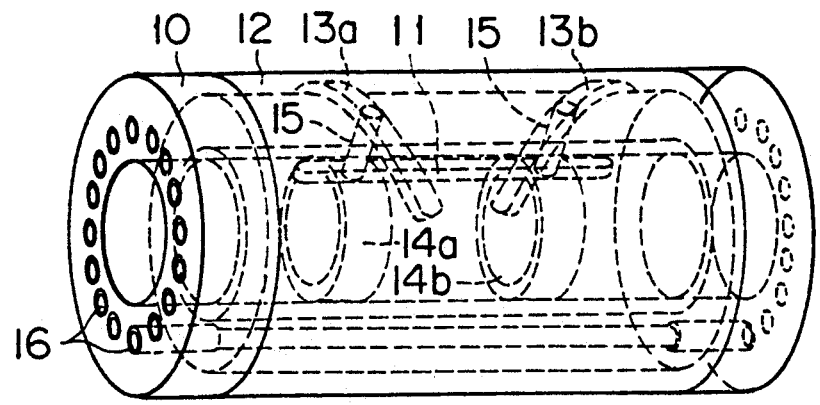

ZOOM LENS HAVING AN ILLUMINATION SYSTEM INCORPORATED THEREIN

BACKGROUND OF THE INVENTION AND PRIOR ART

The present invention relates to a zoom lens having an illumination system incorporated therein which is used for uses requiring illumination.

In the past, no zoom lens having an illumination system incorporated therein has been available.

Therefore, in the case where illumination is required, illumination lamps or illumination devices 2 are arranged in the vicinity of an object to be observed X, as shown in FIG. 1(a); a ring light device 3 is provided at an end of a zoom lens 1, as shown in FIG. 1(b); or illumination devices 2 are mounted on opposite sides of a zoom lens 1, as shown in FIG. 1(c).

The above-described prior art has problems as follows:

1) The FIG. 1(a) arrangement is inconvenient in that when the zoom lens 1 is moved in order to observe an object to be observed located at a different place, the separate illumination systems also have to be moved.

2) The FIG. 1(b) arrangement does not have the problem encountered in the FIG. 1(a) arrangement, but the operability for the purpose of changing the degree of magnification is poor.

3) The FIG. 1(c) arrangement is inconvenient when used at a short working distance (a distance between a zoom lens and an object to be observed), because the illumination system is larger than the zoom lens or is located externally of a lens frame, and therefore, the illumination system hits the object to be observed or the object to be observed becomes invisible from outside or the object to be observed cannot be manually handled.

SUMMARY OF THE INVENTION

It is an object of the present invention to provide a zoom lens free from the inconveniences mentioned above.

The present invention has an arrangement described hereinbelow in order to solve the aforementioned problems.

That is, according to a first embodiment of the invention, there is provided a zoom lens in which pins provided on a variable power lens retaining ring are brought into engagement with cam grooves provided in an inner tube and an operating ring, and the operating ring is rotated to move the variable power lens retaining ring so as to adjust a magnification, characterized in that an illuminating light guide is arranged between the inner tube and the operating ring.

According to a second embodiment of the invention, there is provided a zoom lens in which pins provided on a variable power lens retaining ring are brought into engagement with cam grooves provided in an inner tube and an operating ring, and the operating ring is rotated to move the variable power lens retaining ring so as to adjust a magnification, characterized in that a suitable number of small illuminating incandescent bulbs are arranged around the end on the objective side, and lead wires thereof extend out eon the opposite side from and between the inner tube and the operating ring.

According to this invention, a zoom lens having an illumination system incorporated therein can be constructed so that the whole contour and outer diameter are simple and small in outer diameter without impairing the variable zoom ratio function. The operability when in use is equal to that of the case where no illumination system is provided.

BRIEF DESCRIPTION OF THE DRAWINGS

FIGS. 1(a) to 1(c) are views showing examples in which a conventional zoom lens is used for illumination and observation;

FIG. 2 is a sectional view showing Embodiment 1;

FIG. 3 is an explanatory view showing the arrangement of Embodiment 1;

DESCRIPTION OF THE PREFERRED EMBODIMENTS

Figure 4:
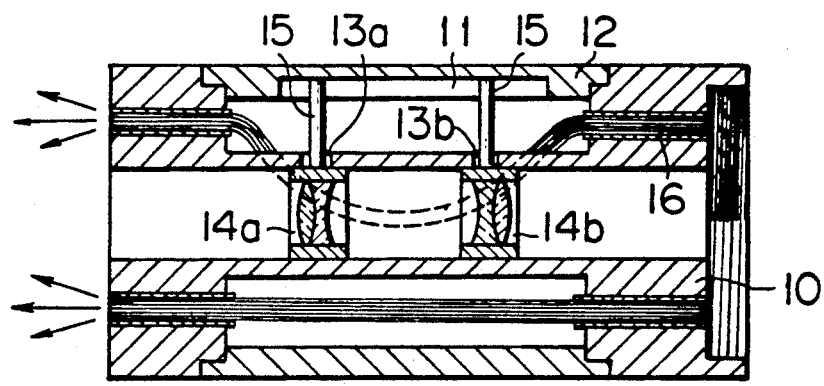
FIG. 4 is a sectional view of Embodiment 2.

FIG. 2 is a sectional view showing Embodiment 1, and FIG. 3 is an explanatory view showing the arrangement thereof. Reference numeral 10 designates an inner tube provided with a linear cam groove 11; 12 designates an operating ring provided at an inner surface thereof with two curved cam grooves 13a and 13b and provided rotatably in the inner tube 10; and 14a and 14b designate variable power lens retaining rings having pins 15 in engagement with the linear cam groove 11 and the curved cam grooves 13a or 13b.

Reference numeral 16 designates an illuminating light guide (optical fiber) provided between the inner tube 10 and the operating ring 12. A suitable number of illuminating light guides 16 are incorporated, opposite ends of which are arranged around the end of the inner tube, as shown in FIG. 3.

With the aforementioned arrangement, when the operating ring 12 is rotated, the variable power lens retaining rings 14a and 14b are moved in a direction of an optical axis by the curved cam grooves 13a and 13b through the pins 15 and 15, whereby zooming is carried out.

In this case, the pins 15 and 15 are merely moved in the direction of the optical axis while being guided by the linear cam groove 11 but not rotated about the optical axis, and therefore, the illuminating light guides 16 do not interfere therewith or constitute an obstacle thereto.

When this zoom lens is attached to a camera body provided with a light source for use, an object to be observed can be illuminated through the illuminating light guides 16.

FIG. 4 is a sectional view showing Embodiment 2, which is different from the aforementioned Embodiment 1 in that conversely to Embodiment 1, the linear cam groove 11 is provided in the operating ring 12, and the curved cam grooves 13a and 13b are provided in the inner tube 10.

Also with this arrangement, zooming is carried out by rotating the operating ring 12. However, unlike the Embodiment 1, since the pins 15 and 15 are rotated, the illuminating light guide 16 is arranged to be bent as shown so as not to interrupt with the rotation thereof.

Even is the illuminating light guide 16 is arranged to be bent as just described, it does not constitute an obstacle to illumination.

Figure 5:
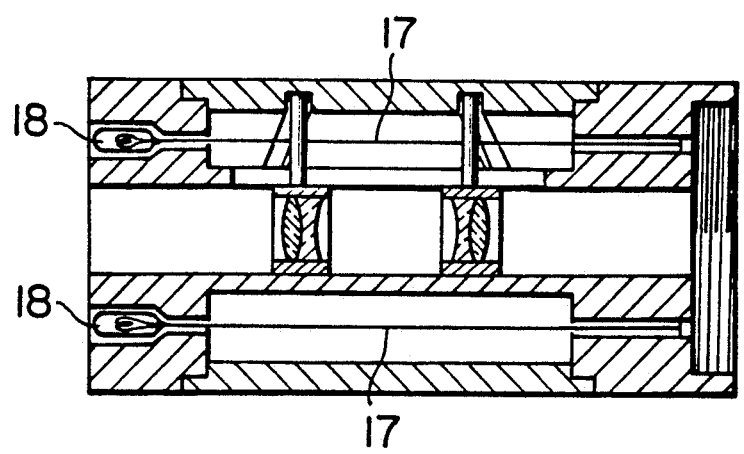
FIG. 5 is a sectional view showing Embodiment 3.

FIG. 5 is a sectional view of Embodiment 3. In place of the illuminating light guides shown in Embodiment 1, small incandescent lamps 18 having lead wires 17 connected thereto are arranged in the same location.

Although not shown, small ring-like fluorescent lamps having lead wires connected thereto can be provided in place of the small incandescent lamps 18 shown in Embodiment 3.

The zoo lens can be used while always changing the zoom ratio thereof. This is desirable, because objects being observed are not always stationary.

In such uses as described, in a zoom lens for which the distance (working distance) between the end of the lens and an object to be observed is short, the operability thereof is important.

According to this invention, a point to be observed can be confirmed directly by naked eyes without impairing the operability as with a conventional basic zoom lens and without a change in zoom ratio or without avoiding change of a point to be observed or removal of the zoom lens. Therefore, the present invention provides a zoom lens having illumination necessary for observation incorporated therein which is small in size and extremely practical.

What is claimed is:

1. A zoom lens and illumination system, comprising:
   an inner tube having at least one first cam groove formed therein, said inner tube having first and second opposing ends;
   an operating ring having at least one second cam groove formed therein, said operating ring being rotatably mounted to said inner tube;
   at least one variable power lens retaining ring axially slidably mounted in said inner tube;
   at least one pin extending from said at least one retaining ring and engaged in said at least one first cam groove and said at lest one second cam groove; and
   at least one illumination element extending between said inner tube and said operating ring from said first end of said inner tube to said second end of said inner tube.

2. A zoom lens and illumination system as recited in claim 1, wherein
   said at least one first cam groove comprises at least one linear cam groove; and
   said at least one second cam groove comprises at least one curved cam groove.

3. A zoom lens and illumination system as recited in claim 2, wherein
   said at least one linear cam groove comprises a single linear cam groove;
   said at least one curved cam groove comprises a pair of curved cam grooves;
   said at least one retaining ring comprise a pair of retaining rings; and
   said at least one pin comprises a pair of pins, said pins extending through said linear cam groove and into said pair of curved cam grooves, respectively.

4. A zoom lens and illumination system as recited in claim 3, wherein
   said at least one illumination element comprises a plurality of light guides.

5. A zoom lens and illumination system as recited in claim 4, wherein
   said plurality of light guides comprises a plurality of optical fibers.

6. A zoom lens and illumination system as recited in claim 3, wherein
   said at least one illumination element comprises a plurality of incandescent lamps with lead wires.

7. A zoom lens and illumination system as recited in claim 1, wherein
   said at least one illumination element comprises a plurality of light guides.

8. A zoom lens and illumination system as recited in claim 7, wherein
   said plurality of light guides comprises a plurality of optical fibers.

9. A zoom lens and illumination system as recited in claim 1, wherein
   said at least one illumination element comprises a plurality of incandescent lamps with lead wires.

10. A zoom lens and illumination system as recited in claim 1, wherein
    said at least one first cam groove comprise at least one curved cam groove; and
    said at least one second cam groove comprises at least one linear cam groove.

11. A zoom lens and illumination system as recited in claim 10, wherein
    said at least one linear cam groove comprises a single linear cam groove;
    said at least one curved cam groove comprises a pair of curved cam grooves;
    said at least one retaining ring comprises a pair of retaining rings; and
    said at least one pin comprises a pair of pins, said pins extending through said pair of curved cam grooves, respectively, and into said axial cam groove.

12. A zoom lens and illumination system as recited in claim 11, wherein
    said at least one illumination element is arranged in a bent shape.

13. A zoom lens and illumination system as recited in claim 11, wherein
    said at least one illumination element comprises a plurality of light guides.

14. A zoom lens and illumination system as recited in claim 13, wherein
    said plurality of light guides comprises a plurality of optical fibers.

* * * * *